Dec. 29, 1964   O. A. CLEMENS   3,163,542
CONTINUOUS MANUFACTURE OF MOLDED SAUSAGE PRODUCTS
Filed April 3, 1961   2 Sheets-Sheet 1

OGDEN A. CLEMENS
INVENTOR.

BY R. G. Story
ATTORNEY

Dec. 29, 1964 O. A. CLEMENS 3,163,542
CONTINUOUS MANUFACTURE OF MOLDED SAUSAGE PRODUCTS
Filed April 3, 1961 2 Sheets-Sheet 2

OGDEN A. CLEMENS
INVENTOR.

BY
ATTORNEY.

United States Patent Office 3,163,542
Patented Dec. 29, 1964

3,163,542
CONTINUOUS MANUFACTURE OF MOLDED
SAUSAGE PRODUCTS
Ogden A. Clemens, Chicago, Ill., assignor to Swift &
Company, Chicago, Ill., a corporation of Illinois
Filed Apr. 3, 1961, Ser. No. 100,063
15 Claims. (Cl. 99—109)

This invention deals with a method and system for manufacturing molded food products; and more specifically relates to an improved method and system for molding sausage type products particularly of the frankfurter class.

In the last few years, there has been developed a new method and apparatus for the manufacture of sausages or the like. In this process the comminuted sausage mix in a fluid or semi-fluid form is inserted into a fixed mold rather than a flexible casing. An electric current is passed through the mix whereupon the mix is set up into a solid, self-sustaining form in a matter of seconds. After reaching that form, the mix may be ejected from the mold into a suitable holder or carrier for further cooking and smoking carried out generally in accordance with the conventional practices that have been followed for many years. This process differs principally from the prior art in the immediate setting up of the mix into a self-sustaining form in a matter of seconds, or less, in a fixed mold which enables the dispensing of the conventional steps of stuffing a flexible casing in which the mix remains for all of its processing. Further details of the process will be found in U.S. Patents, No. 2,877,118 and 2,965,491, the disclosures of which are included herein by reference. The present invention constitutes an improvement in the above process and enables production of a noticeably improved sausage type product exhibiting superior texture and shape.

Furthermore, the foregoing patents represent a radically new technique for the production of sausages or the like, that is particularly adaptable to large scale production of product on multiple, parallel lines. The molding apparatus taught in Patents No. 2,877,118 and 2,965,491 is most efficiently and economically employed in gangs of multiple molds for rapid production and best utilization of associated facilities such as stuffers and ovens, etc. The present invention is particularly useful in conjunction with a plurality of apparatus of the foregoing type.

One of the problems constantly faced in the sausage industry, where incessant production of uniformly high quality product is necessary, is the difficulty in maintaining close weight and size control of each item of product so that consumer packages of a given weight can be made up from a given number of whole items. Additionally it has been difficult to mold all items of product under conditions that will result in uniform cooking as between all items. In this regard the texture and shape of every item produced should be uniformly pleasing. Furthermore, each item should conform to a desired weight and size within negligible tolerance limitations.

However, in large scale production techniques, particularly where several molds may be ganged together, and where multiple gangs of such mold units are employed, it is extremely difficult to maintain substantially the same operating conditions throughout all molds. This is especially true with regard to operating pressures when several molds, or gangs of molds, are supplied with sausage mix from a single source. I have found the pressure factor is of extreme importance in obtaining uniformly cooked and shaped product as between the molds since it, in part, directly affects density of the product and the electrical resistance and conductance characteristics of the mix. Texture of the product is also related to the density and therefore to pressure on the mix; and to some extent the weight of a given item of the product is also related to pressure on the mix.

Accordingly, it is a principal object of this invention to provide an improved method and system to produce a superior and uniform molded sausage type product.

It is another object of this invention to provide an improved process and system for the production of uniform molded sausage type products in multiple or gangs of molding units.

It is a further object of this invention to provide an improved method for producing molded sausage type products wherein the sausage mix is injected into the mold at unusually high pressure to achieve superior texture and uniformly shaped product.

The present invention basically contemplates the forcing of food material, such as a comminuted sausage mix, into a mold cavity under unusually high pressure of above about 130 p.s.i.g. and setting up the material into a self-sustaining product. The present invention also contemplates a further improvement, in conjunction with filling a molding cavity at unusually high pressure, comprising the step of setting up the material by the application of heat throughout the mix commencing at a time prior to complete filling of the mold cavity.

Further objects and advantages of this invention will become apparent when reading the following description taken in conjunction with the drawings wherein:

FIGURE 3 is a graph showing the effect of increased injection pressures on the after-growth characteristics of molded sausages.

Figure 1:
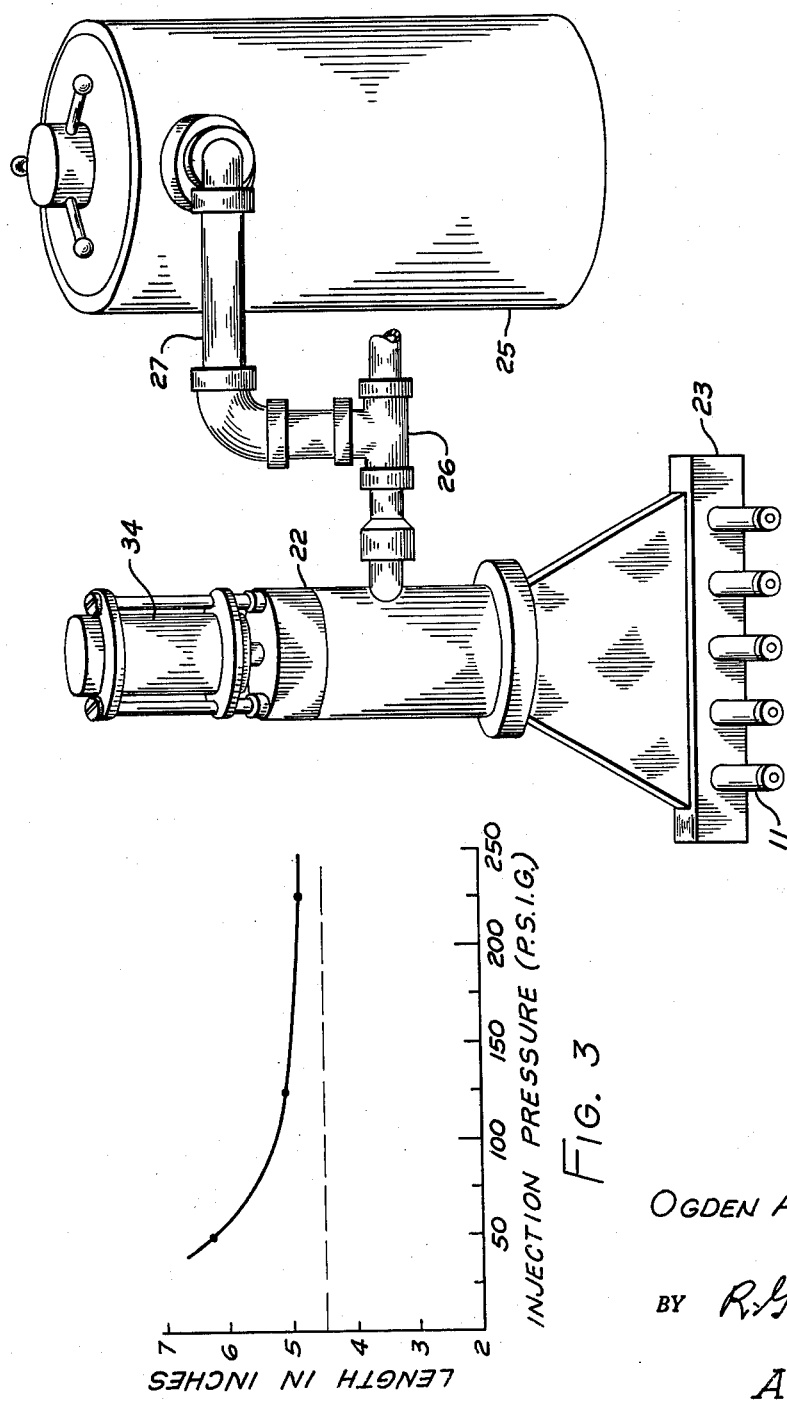
FIGURE 1 is an illustration of the overall system for filling sausage molds.

I have found that a superior sausage type product, especially product of the frankfurter class, having improved appearance and improved qualities of texture and shape may be produced substantially in accordance with the aforementioned Hensgen et al. Patent No. 2,877,118, and my prior Patent No. 2,965,491, but without the necessity of withdrawing air from the mold or sausage mix (as taught by the latter patent), by increasing the pressure for forcing the sausage mix into the molding cavities to above about 130 p.s.i.g., and preferably within the range of about 175 p.s.i.g. to 250 p.s.i.g. Such unusually high pressures have the additional advantage of minimizing the effect of variations in pressure on the mix at the different molds in a gang type production line. As a result in the latter type operation sausages produced in each of a plurality of molds will be of uniform texture, shape, and weight.

I prefer to impose the very high pressure on the sausage mix as closely proximate to the actual molding device as possible. This is necessary because it has been found that food mixtures containing comminuted meat, when forced through substantial lengths of conduit at high pressure, will tend to "grease out" and cause a separation of fat and protein. Accordingly the present method of boosting the pressure just in advance of the molding cavities enables the use of standard stuffing equipment to supply sausage mix to a plurality of molds or gangs of molds, through relatively great lengths of conduit and at stuffer pressures reduced to 60 p.s.i.g. or less. This is especially noteworthy in view of the fact that such stuffing equipment normally operates at about 75 to 100 p.s.i.g., requiring conventional stuffing horns, or other stuffing equipment, to be as close to the stuffers as possible.

I have also found that product may be obtained more economically in conjunction with the preceding step where the setting up of the food mix in expansible molds, of the type disclosed in the aforementioned patents, is commenced before such molds are completely filled and expanded to their full length. The rate of production per mold may be substantially increased since the time required between the beginning of the filling operation and completion of the setting up step is substantially reduced. Previously, as disclosed in my prior patent, it was only contemplated that the mold be filled completely and locked in expanded position before heating the mixture to set up the product. Only in this way was it thought that the extremely high pressures developed through the tendency of the material to expand during the heating step could be utilized to form a better product. However, it has now been found that such high pressures as are achieved during the setting up of the sausage mix may be fully utilized according to my present invention wherein the filling of the molds is carried out at unusually high pressure and heating is commenced before the filling is completed.

Preferably, in conjunction with filling pressures exceeding 130 p.s.i.g., the heating of the sausage mix is commenced when the mold is about two-thirds to three-quarters filled with the mix. Additionally the heating is continued until after such time as the mold is completely filled, and for a sufficient period thereafter to raise the temperature of the mix to about 130° F. and to affect coagulation throughout substantially all of the mix within the mold.

As in my prior patent I also prefer to carry out the heating step by the use of high frequency electrical resistance heating within the product itself. In this way substantially all portions of the sausage mix are heated simultaneously to coagulation temperatures and the sausage is set up in the shortest possible time. By high frequency, a current alternating at about 10,000 c.p.s. is meant. However, lower frequencies such as 60 c.p.s., and even direct current, may be utilized to effect resistance heating of the product.

Figure 2:
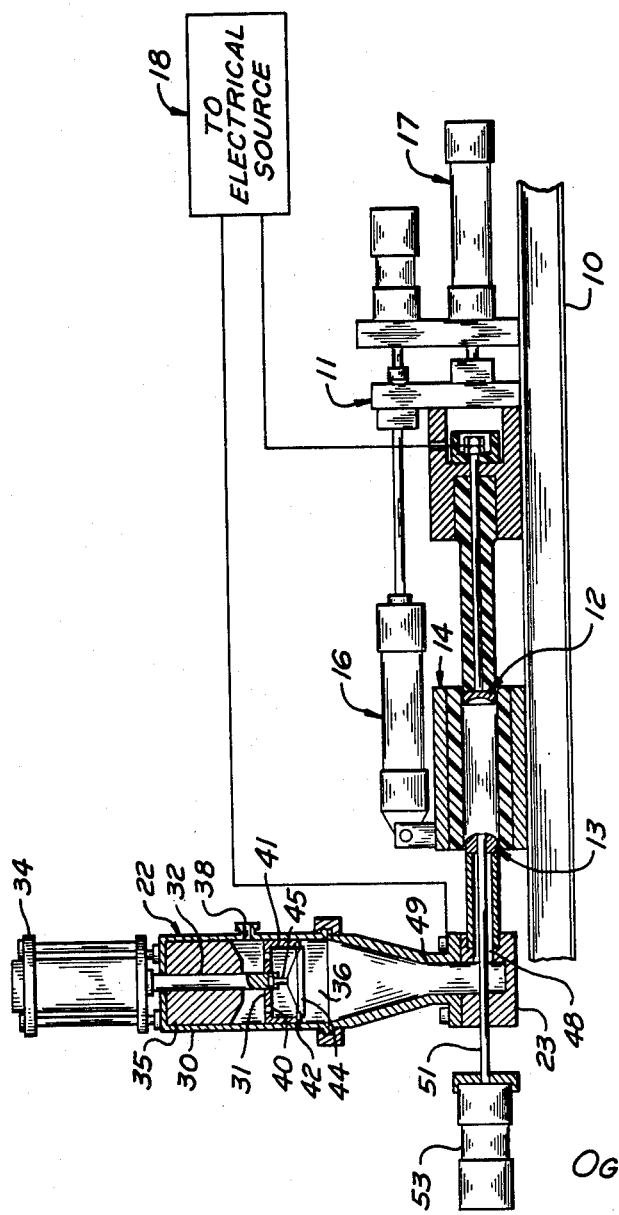
FIGURE 2 is a simplified sectional view showing a portion of the system comprising a molding apparatus and a means to boost the pressure on the food material mix to an unusually high level just in advance of the molding apparatus.

A preferred system for carrying out my method is shown in FIGURES 1 and 2. The molding means generally 11 shown in FIGURE 2 is substantially identical to the apparatus of my prior patent, and comprises a frame generally 10 upon which is mounted a movable electrode and mounting means generally 12, a fixed electrode and mounting means generally 13, and a movable mold sleeve generally 14. The molding means 11 also includes a power means generally 16 for moving the mold sleeve 14 and another power means 17 for moving the movable electrode 12 with respect to the fixed electrode 13. Also included is a control means shown diagrammatically at 18 which includes a source of electrical power.

Basically, operation of the molding means 11 is accomplished by first bringing the movable electrode 12 and mold sleeve 14 into abutment with the fixed electrode 13; and then withdrawing the movable electrode from the fixed electrode through the sleeve (the latter being held stationary at the fixed electrode) while simultaneously injecting sausage mix into the expanding space therebetween through an aperture in the fixed electrode. The mix within the space or cavity between electrodes is heated in the preferred structure by an electric current passed through the mix between the electrode faces; and when the mix is set up into a self-sustaining form, the movable electrode is further withdrawn slightly, to release pressure, and the item is ejected by moving the movable sleeve 14 telescopically over the movable electrode 12 (while the latter is held in the withdrawing position). Subsequently, the actions are repeated by bringing the electrodes together to continuously produce sausages.

According to my invention, one or more of such molding means 11 (preferably a gang or plurality of such means) is connected to a pressure boosting means generally 22 at a valve block 23. In turn, one or more of such assemblies, including the pressure boosting means generally 22 are connected to a source of comminuted sausage mix under low pressure, such as a substantially conventional stuffer apparatus 25, through a manifold 26 and pipe line 27. Where a plurality of pressure boosting means 22 are utilized they are arranged for parallel flow of sausage mix from the stuffer apparatus 25. Furthermore, each molding means 11 is arranged in parallel with other molds within each group and between groups. According to this arrangement, the stuffer apparatus 25 constitutes a first pressure means, supplying sausage mix at relatively low pressure over relatively long distances, and the pressure booster means 22 constitute second pressure means which receive the sausage mix at low pressure and deliver it at relatively high pressure directly to the several molds.

Concerning the pressure boosting means 22, an exceptionally satisfactory unit has been devised comprising a cylinder 30 and an internal piston 31. The piston is reciprocated within the cylinder 30 my means of a connecting rod 32 which is connected to the internal piston of a hydraulic cylinder unit generally 34. As shown in FIGURE 2 the upper end of cylinder 30, between the piston 31 and hydraulic cylinder unit 34, is closed by a plug 35 adapted to slidably receive the connecting rod 32. Beneath the plug 35 is a cylinder barrel 36 within which the piston 31 reciprocates. A T connector 38 is located at the upper end of the cylinder barrel 36 at a location above the top of the piston stroke and is connected directly to the manifold 26 and hence to the stuffer apparatus 25. The lower end of the cylinder cavity 36 is connected to the valve block 23.

A plurality of ports 40 are provided in the face of the piston 31; and a piston skirt 41, extending away from the connecting rod 32, is beveled internally to form a valve seat 42. A valve 44, with a matching bevel for contact with the valve seat 42, is floatingly suspended by its stem 45 from the underside of piston 31 where it is slidingly received in the end of connecting rod 32 so as to be vertically reciprocable through a short distance into engagement with the valve seat 42.

It will be obvious from the foregoing description that when hydraulic cylinder 34 moves the piston 31 upwardly, the valve 44 will be moved away from valve seat 42 by sausage mix being forced from the upper portion of the cylinder barrel 36 through ports 40. However, when the piston 31 is reciprocated downwardly against sausage mix in the bottom of the cylinder barrel 36, the valve 44 will move against its seat 42 and the material ahead of the piston 31 will be forced into the valve block 23 and thence into the molding means generally 11. Obviously, the relative size of the piston in the hydraulic cylinder unit 34, as compared to the size of piston 31, and the pressures within the hydraulic cylinder unit will dictate the pressure exerted on sausage mix material being forced into the valve block 23. Accordingly, the hydraulic cylinder unit 34 is connected in a conventional manner through suitable valves to a source of hydraulic fluid under pressure, not shown.

As was previously mentioned and shown in the figures, one or more molding means generally 11 are connected to the valve block 23 through an equal number of openings 48 situated at one end of a common passageway 49 communicating with the cylinder cavity 36. An equal number of valve rods 51 extend through the passageway to each of the openings 48, from the opposite side of the valve block 23. Valve rods 51 are reciprocable between a position which exposes the openings 48 through passageway 49, and a position within the fixed electrode generally 13 of the molding means generally 11 to close said openings from the passageway 49. When in the latter position the end of valve rods 51 are contiguous with the inner surface of the fixed electrode and form a closure to the sausage molding cavity. The opposite end of each of the valve rods 51 is preferably connected to a common actuating means such as a hydraulic cylinder 53 or similar pneumatic device. Actuation of the hydraulic cylinder 53 by way of conventional valving, not shown, will affect either insertion or withdrawal of the rods in openings 48.

Substantially the same control system as is disclosed in my prior Patent No. 2,965,491 may be utilized to operate the system of my improved invention. Operation of the actuating means generally 53 is accomplished in the same sequence as with the similar element in my prior patent. Additionally, actuation of the hydraulic cylinder unit 34 of the present invention may conveniently be coordinated with the actuating means 53 so that the piston 31 is forced downwardly when the actuating means 53 moves to withdraw the valve rods 51 from openings 48. Similarly, the hydraulic cylinder unit 34 is caused to raise piston 31 during the period that the actuating means 53 holds the valve rods 51 within the openings 48 and the fixed electrodes 13. Preferably, however, to facilitate immediate flow of sausage mixture under high pressure into the molding means generally 11 it is desirable to advance the downward actuation of piston 31 to a time just prior to the withdrawal of valve rods 51 through openings 48; and the stroke of piston 31 should be sufficiently long to permit movement during the entire period that the valve rods are withdrawn. The same control means generally 18 is also satisfactory for regulating the application of electrical current to the movable and fixed electrodes 12, 13 respectively. However, according to my preferred method wherein the high frequency current is commenced prior to the time that the molding means 11 are completely filled, the timing drive and associated switch cam of the previously described control system should be advanced.

The following sequence of operation of my preferred system will have become obvious from the foregoing description. Conventional sausage mix is first loaded into the stuffer 25 which is then actuated to force emulsion therefrom at the lower than normal pressure of about 60 p.s.i.g. The sausage mixture flows at this pressure through pipeline 27 and manifold 26 to the pressure boosters 22. During the time that the molding means 11 are fully charged with sausage mixture and are closed to the addition of additional mixture, the pressure boosting means generally 22 is charged with sausage mixture at substantially 60 p.s.i.g.

When the molding means generally 11 is in position to receive a new charge of sausage material, and just prior to the time at which the valve rods 51 are withdrawn from the fixed electrodes 13 and openings 48, the piston 31 in the pressure boosting means 22 is moved downwardly to exert a pressure upwardly of 130 p.s.i.g. on the sausage mixture. Thus, when the molding cavity of the molding means 11 is placed in communication with the valve block 23 sausage mixture is immediately available at a constant and high pressure. Accordingly, as the moveable electrode generally 12 of the molding means 11 is moved away from the fixed electrode 13, the sausage mixture, at such high pressure, is forced into the expanding sausage mold cavity.

At about the moment that the moveable electrode 12 is about two-thirds to three-quarters withdrawn, an electric current is passed through the sausage mixture between the movable and fixed electrodes 12, 13 respectively. The current is continued during a short interval extending beyond the time that the movable electrode 12 comes to rest. The full period of application of such current is sufficient to achieve a coagulating temperature through the entire quantity of sausage mix within the molding means 11; and upon the lapsing of a sufficient interval of time for the coagulation to be effected, the movable mold sleeve generally 14 is moved in the direction of the movable electrode 12 to open the molding means 11 for the ejection of a formed sausage.

*Example I*

As an example, a frankfurter type mix comprising the following ingredients:

| | Percent |
|---|---|
| Regular pork trimmings | 41.9 |
| Pork cheek and head meat | 7.4 |
| Special extra lean pork trimmings | 2.2 |
| Cow meat (beef) | 14.7 |
| Plates and flanks | 7.4 |
| Spices | 6.6 |
| Water (added) | 19.8 | was prepared and charged to a stuffer. The mix was forced from the stuffer at about 60 p.s.i.g. to a plurality of pressure boosters where the pressure on the mix was raised to about 130 p.s.i.g. when injected into gangs of molds. Each mold extended a distance of four and seven-eighths (4⅞) inches between electrodes. About 1.78 oz. of mix was charged to each mold. The molds were similar to the type described in my aforementioned prior patent, but included a concave movable electrode and a closely matching convex stationary electrode, leaving negligible air in the cavity. These molds were cycled on a two-second stuffing time and eight-second heating time commencing one and one-half seconds after stuffing was initiated and extending seven and one-half seconds after stuffing was completed. Power supplied during the heating time was at about 350 volts, 10,000 c.p.s. Thereafter, the set up items were ejected from their respective molds and further processed in ovens to complete cooking requirements whereupon they underwent approximately 9% loss in weight. The final product weighed approximately 1.62 oz. per item and was five and one-eighth (5⅛) inches long. All items from all molds showed very close conformity as to size, shape and weight. All items were uniformly cooked and presented a very smooth exterior surface and pleasing internal texture.

*Example II*

Another batch of sausage mix comprising the above formula was forced into substantially the same type and dimension mold as in Example I at 225 p.s.i.g.; and thereafter processed substantially identically as in the preceding example. Similarly, very superior uniformly cooked items of product were produced as compared to items stuffed at lower, conventional pressures. These items were uniformly five (5) inches long and accordingly showed a significant improvement even over the product of Example I with regard to conforming the product to the actual size of the mold cavity.

*Example III*

For the purpose of after-growth comparsions, batches of substantially the same mix as in Example I were prepared and stuffed in the same general type apparatus under controlled conditions wherein only the injection pressure was varied. All other conditions were substantially the same as in Example I; however, the molding cavities were defined by a concave movable electrode and a flat stationary electrode (as shown in my prior patent) between which a small amount of air was permitted to be trapped before injection of the mix was commenced, and which were extendable to a distance of four and one-half (4½) inches for filling.

The results of these tests under varying injection pressures is shown in the graph of FIGURE 3 wherein the lengths of resultant product are plotted as the ordinates against respective injection pressures plotted as the abscissas. It will be noted that all ordinates fall above the datum line of 4½ inches, representing mold length. This conforms to a general observation that nearly all molded products of this type, produced from a mix containing major portions of meat from warm-blooded animals, will show some growth after molding. However, it may also be readily noted that above about 130 p.s.i.g. injection pressure the plotted curve is substantially flat and variation in length of the end product is very small or negligible and reaches an apparent minimum of about one-eighth (⅛) inch at 225 p.s.i.g. Below injection pressures of about 130 p.s.i.g. there is shown a marked tendency to increased growth which amounted to as much as one and three-quarters (1¾) inches at 50 p.s.i.g.

While several factors such as the sausage mix formula, the shape of the electrode faces, the amount of air permitted in the mold or mix, and others, may affect the total amounts of after-growth in molded sausage type products, I have found that in general, while other conditions remain constant, the effect demonstrated in the above examples and in FIGURE 3 still holds. Accordingly, at high injection pressures within the range of 130 p.s.i.g. to 250 p.s.i.g., and particularly at above about 175 p.s.i.g., it may not be assumed that items thus produced will not only conform closely to one another but will also conform closely to the size and dimensions of the mold cavity. This is a significant advantage in preparing to handle molded items for final processing and for packaging.

Furthermore, increased stuffing pressure at the molding cavity is thought to develop a toughening of the sausage texture, resulting in a firmer product. This is of advantage both in further handling of the items after molding, and from the standpoint of palatableness.

Obviously, many modifications and variations of the invention as hereinbefore set forth may be made without departing from the spirit and scope thereof, and, therefore, only such limitations should be imposed as are indicated in the appended claims.

I claim:

1. An improved method of manufacturing a sausage type food product from a comminuted mixture containing meat, said method comprising: pumping said mixture from a source at a relatively low pressure toward a mold cavity; forcing said mixture at above about 130 p.s.i.g. into said mold cavity said pressure of about 130 p.s.i.g. being applied at a location proximate said cavity; and rapidly heating said mixture within said cavity to set it up into a self-sustaining product.

2. An improved method of manufacturing a sausage type food product from a commnuted mixture containing meat, said method comprising: pumping said mixture at a pressure of about 60 p.s.i.g. from a source toward an expansible mold cavity; forcing said mixture into said mold cavity under a pressure of between about 175 p.s.i.g. and about 250 p.s.i.g. said latter pressure being applied at a location proximate said cavity; expanding said cavity to receive said mixture at said pressure; and rapidly heating the mixture within said expanding cavity to set it up into a self-sustaining product.

3. An improved method of manufacturing a sausage type food product from a comminuted mixture containing meat, said method comprising: forcing said mixture at a pressure above about 130 p.s.i.g. into an expansible mold cavity said pressure being applied at a location proximate said cavity; expanding the mold cavity to receive said mixture at said pressure; commencing rapid heating of the mixture within said cavity before said cavity is fully expanded to its ultimate size and before all of the mixture required to fill the expanded cavity has been forced therein; and continuing to heat the mixture within said cavity after said cavity is fully expanded for a period sufficient to cause the mixture therein to set up into a self-sustaining product.

4. The method of claim 3 wherein the heating is accomplished electrically so as to substantially simultaneously heat all portions of the mixture within said cavity.

5. The method of claim 3 wherein the heating is commenced when the cavity is between about two-thirds to three-quarters expanded.

6. An improved method of substantially continuously manufacturing molded food sausage type product items, said method comprising: pumping the food product from a source toward a plurality of expansible molding cavities at a relatively low pressure of about 60 p.s.i.g. and less, whereat the product will remain homogeneous; boosting the pressure on said food product just in advance of each of said cavities so as to force the product therein at a pressure above about 130 p.s.i.g.; gradually expanding each of said cavities to receive said product at said boosted pressure; rapidly heating the product within said cavities sufficiently to set up into self-sustaining product items, said heating commencing during the expansion of said cavities and before said cavities are completely filled with product; and ejecting said self-sustaining items from each of said cavities when sufficiently set up.

7. An improved method of substantially continuously manufacturing molded sausage type items, said method comprising: pumping a sausage mixture from a source toward a plurality of expansible molding cavities at a pressure of about 60 p.s.i.g.; boosting the pressure on said mixture just in advance of each of said cavities so as to force the mixture therein at a pressure of about 175 p.s.i.g. to about 250 p.s.i.g.; gradually expanding each of said cavities to receive said mixture at said boosted pressure; rapidly heating the mixture within said cavities sufficiently to set up into self-sustaining product items, said heating being accomplised by direct electrical resistance heating and commencing during the expansion of said cavities and before said cavities are completely filled with mixture; and ejecting said self-sustaining items from each of said cavities when sufficiently set up.

8. An improved method of substantially continuously manufacturing molded sausage type items, wherein said items are individually molded in a plurality of molds, said method comprising: pumping a sausage mixture from a source toward a plurality of expansible molding cavities at a pressure of about 60 p.s.i.g.; boosting the pressure on said mixture just in advance of said cavities, so as to force the mixture into each cavity at a pressure of about 175 p.s.i.g. to about 250 p.s.i.g.; gradually expanding each of said cavities to receive said mixture at said boosted pressure; rapidly heating the mixture within said cavities sufficiently to set up into self-sustaining product items; and ejecting said self-sustaining items from each of said cavities when sufficiently set up.

9. An improved method of substantially continuously manufacturing molded sausage type items, wherein said items are individually molded in a plurality of molds, said method comprising: pumping a sausage mixture from a source toward a plurality of expansible molding cavities at a pressure of about 60 p.s.i.g.; boosting the pressure on said mixture just in advance of said cavities, so as to force the mixture into each cavity at a pressure of about 175 p.s.i.g. to about 250 p.s.i.g.; gradually expanding each of said cavities to receive said mixture at said boosted pressure; rapidly heating the mixture within said cavities sufficiently to set up into self-sustaining product items, said heating being accomplished by direct electrical resistance heating and commencing when said cavities are between about two-thirds to three-quarters fully expanded and before said cavities are completely filled with mixture; and ejecting said self-sustaining items from each of said cavities when sufficiently set up.

10. An improved system for substantially continuous production of sausage type items, said system comprising: a source of raw sausage mixture; a plurality of molding means for forming such mixture into the shape of a product item; conduit means connecting said source to said molding means in parallel; first pressure means for pumping said mixture at relatively low pressure through said conduit means; second pressure means in said conduit for applying a relatively high pressure to said mixture just in advance of each of said molding means, said second pressure means being associated with said conduit means at a point in close proximity to said molding means; and heating means connected to each of said molding means for rapidly heating the mixture to set it up therein.

11. An improved system for substantially continuous production of sauage type items, said system comprising: a source of raw sausage mixture; a plurality of groups of molding means for forming such mixture into the shape of product items; conduit means connecting said source to said groups of molding means in parallel; first pressure means for pumping said mixture at relatively low pressure through said conduit means; second pressure means in said conduit for applying a relatively high pressure to said mixture just in advance of each of said groups of molding means, said second pressure means being associated with said conduit means at a point in close proximity to said molding means; and heating means connected to each of said molding means for rapidly heating the mixture to set it up therein, said heating means being operable for periods of time commencing while each molding means is being filled.

12. An improved system for substantially continuous production of sausage type items, said system comprising: a plurality of molding means in spaced communication with a source of sausage mixture; a pressure boosting means connected closely adjacent said molding means between said molding means and said source, said boosting means being in communication with both said molding means and said source so as to apply relatively high pressure to said sausage mixture delivered to said molding means; and heating means connected to said molding means to set up the mixture introduced therein.

13. The improved system of claim 12 wherein the heating means is connected to begin heating said mixture within the molding means before the complete amount thereof has been introduced therein.

14. An improved method of manufacturing a molded food sausage type product, said method comprising: pumping a food material from a source at a relatively low pressure toward an expansible molding cavity; forcing said food material at a pressure of between 130 p.s.i.g. to 250 p.s.i.g. into said cavity, said latter pressure being applied at a location proximate said cavity; expanding said cavity to receive said material at said pressure; and setting up said material to form a self-sustaining product within said cavity.

15. An improved method of manufacturing a molded food sausage type product, said method comprising: pumping a food material from a source at a relatively low pressure toward a molding cavity; forcing said food material at above about 175 p.s.i.g. into said cavity, said latter pressure being applied at a location proximate said cavity; and setting up said material to form a self-sustaining product while in said cavity.

References Cited in the file of this patent

UNITED STATES PATENTS

| | | |
|---|---|---|
| 2,623,451 | Prohaska | Dec. 30, 1952 |
| 2,685,518 | Prohaska | Aug. 3, 1954 |
| 2,799,585 | Hensgen et al. | July 16, 1957 |
| 2,877,118 | Hensgen et al. | Mar. 10, 1959 |
| 2,965,491 | Clemens et al. | Dec. 20, 1960 |
| 3,107,392 | Schmook | Oct. 22, 1963 |